United States Patent [19]
Simon

[11] 3,897,147
[45] July 29, 1975

[54] LAMPHOUSE ASSEMBLY FOR PHOTOGRAPHIC PRINTERS AND ENLARGERS

[75] Inventor: Murray H. Simon, Northglenn, Colo.

[73] Assignee: Peter Simon, Sumner, Md.; a part interest

[22] Filed: Mar. 20, 1974

[21] Appl. No.: 453,109

[52] U.S. Cl. .................................... 355/37; 355/70
[51] Int. Cl.² .................... G03B 27/54; G03B 27/76
[58] Field of Search ............. 355/37, 70, 35, 36, 38

[56] References Cited
UNITED STATES PATENTS

| | | | |
|---|---|---|---|
| 2,480,101 | 8/1949 | Weisglass | 355/70 X |
| 3,011,388 | 12/1961 | Baumbach et al. | 355/35 X |
| 3,217,594 | 11/1965 | Simmon | 355/35 X |
| 3,222,985 | 12/1965 | Remesat | 355/37 |
| 3,227,040 | 1/1966 | Dauser | 355/38 |
| 3,272,067 | 11/1966 | White | 355/70 |
| 3,345,509 | 10/1967 | Dauser | 355/37 X |
| 3,714,875 | 2/1973 | Yost, Jr. | 355/37 X |
| 3,739,700 | 6/1973 | Yost, Jr. | 355/37 X |

Primary Examiner—Samuel S. Matthews
Assistant Examiner—E. M. O'Connor
Attorney, Agent, or Firm—Lane, Aitken, Dunner & Ziems

[57] ABSTRACT

In a lamphouse assembly, two sets of three filtered high intensity lamps direct red, green and blue light toward either half of a roof-shaped translucent top of an optical mixing chamber. The vertical sides of the mixing chamber have a reflecting, diffusing coating and the bottom is formed by a final diffusing plate below which a photographic negative is held. Thoroughly mixed, soft white light is evenly distributed over the negative at high intensity via the final diffusing plate. Each trio of lamps is mounted at the correct position relative to the mixing chamber by means of a unitary angled bracket secured to an inspection cover plate facilitating access to each lamp assembly.

11 Claims, 4 Drawing Figures

LAMPHOUSE ASSEMBLY FOR PHOTOGRAPHIC PRINTERS AND ENLARGERS

BACKGROUND OF THE INVENTION

The invention relates generally to color photographic printing and enlarging equipment, and, more particularly, to a lamphouse with plural filtered lamps and a light mixing chamber.

In color photographic printing and enlarging, it is conventional practice to blend light from three filtered light sources, usually red, green and blue, to produce a homogenous soft white light which is projected through a color negative to a printing paper or transparency having color sensitive layers. To combine the different colors of light, various approaches have been used in the past including systems employing optical condensers (a lens system) in conjunction with a translucent integrating sphere or hemishpere and systems of the type using mixing chambers involving complicated combinations of translucent and reflective diffusing surfaces. Systems using condensers have the disadvantage of emphasizing scratches, retouching marks and dust specks on the negative.

U.S. Pat. No. 3,630,639 to Clapp represents an example of a lamphouse assembly employing a mixing chamber. In the Clapp patent the mixing chamber has a completely reflective roof and the lamps are individually mounted such that their optical axes are perpendicular to the path of light passing through the negative. Because of the high number of reflections which occur in the Clapp arrangement with premixing chambers and a primarily reflective main mixing cubicle, much of the original intensity of the light sources is sacrificed. The lower the intensity of the diffused light applied to the negative, the longer the exposure time.

In the past the expense of color photographic enlarging and printing equipment has restricted its use to production work to a much larger extent than in black and white printing. Color printing equipment of good quality has been generally prohibitive in cost to photographic hobbists, artists and other noncommercial photographers as well as professional photographers with limited resources.

SUMMARY OF THE INVENTION

The general purpose of the invention is to provide a compact, lightweight, low cost lamphouse assembly for color photographic printing and enlarging, which is adaptable to existing photographic enlargers. A more specific object of the invention is to couple more of the direct intensity of a plural lamp arrangement to the negative area to shorten the exposure time. Another object of the invention is to facilitate mounting and removal of plural lamp assemblies by utilizing an interconnected inspection cover and lamp mounting bracket arrangement. Still another object of the invention is to provide a mixing chamber in which the roof portion is composed of joined translucent panels such that light is applied through the translucent panels to a final diffusing plate directly below the roof portion.

These and other objects of the invention are accomplished by a unique arrangement of two sets of three filtered high intensity lamps which direct red, green and blue light in an overlapping pattern toward either half of a roof-shaped translucent top of an optical mixing chamber. The upright sides of the mixing chamber have a reflecting diffusing coating and the bottom is formed by a final diffusing plate below which a photographic negative is held. Thoroughly mixed soft white light is evenly distributed over the negative at high intensity via the final diffusing plate. The optical axis of each of the lamps obliquely intersects the final diffusing plate in the mixing chamber to permit more of the direct intensity of the lamps' output to be coupled to the negative area in order to shorten the required exposure time.

Each trio of lamps is mounted at the correct position by means of a unitary angled bracket secured to an inspection cover plate facilitating access to each lamp assembly. When the cover plate is removed, the corresponding three-lamp assembly is removed intact for inspection or replacement of individual lamps. Because of the special mounting bracket, merely replacing the cover plate automatically aligns the lamps. The design of the lamphouse results in an extremely compact, lightweight and low-cost color head adaptable to existing black and white photographic enlargers. In the preferred embodiment, the construction of the lamphouse is so compact and lightweight that separate controls for the individual lamps can be mounted directly on the lamphousing itself.

DESCRIPTION OF THE PREFERRED EMBODIMENTS

Figure 1:
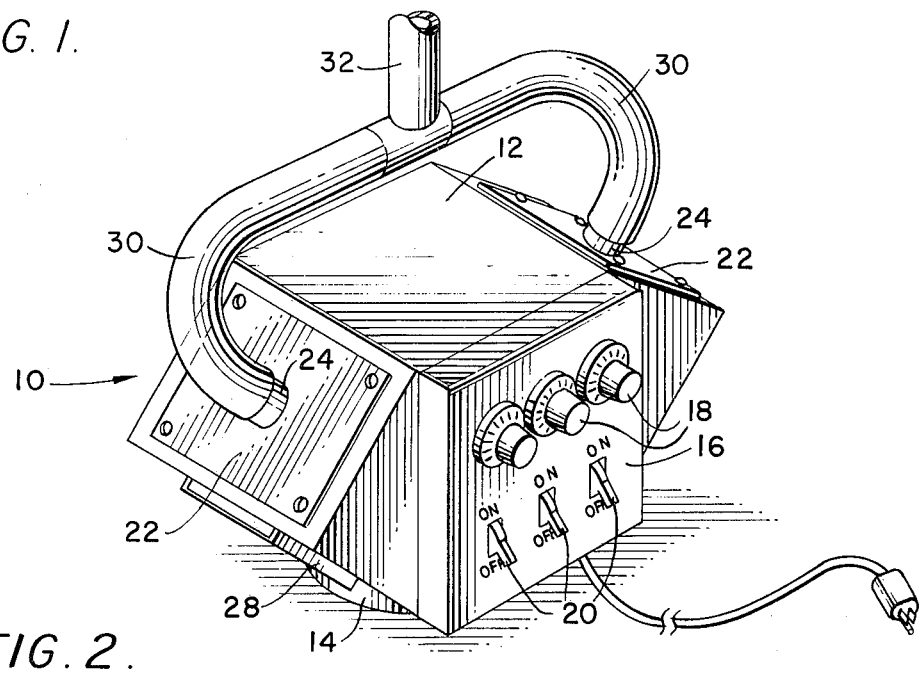
FIG. 1 is a perspective view of an embodiment of the lamphouse assembly according to the invention.
Figure 2:
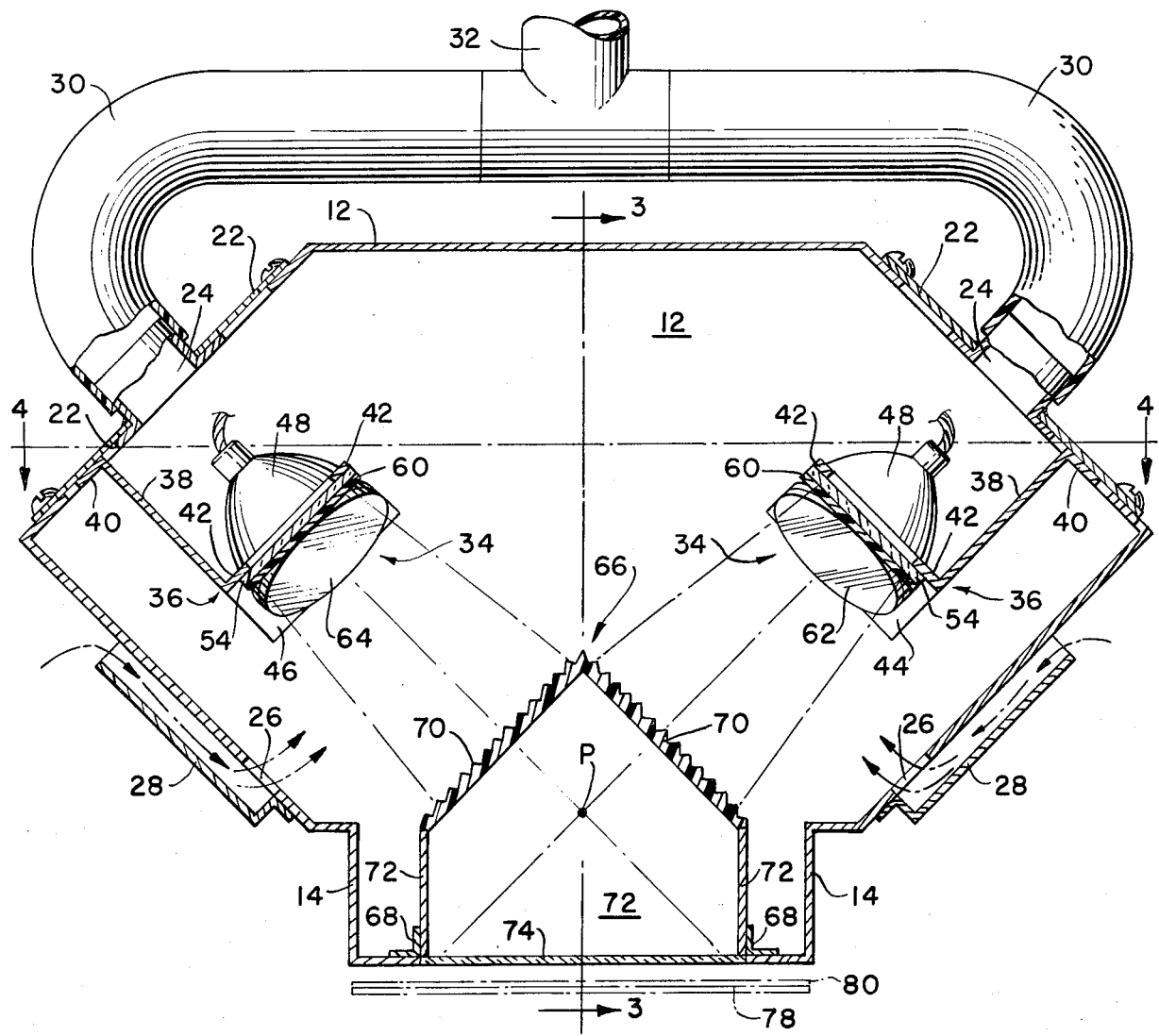
FIG. 2 is a sectional view showing the interior of the lamphouse assembly of FIG. 1.
Figure 3:
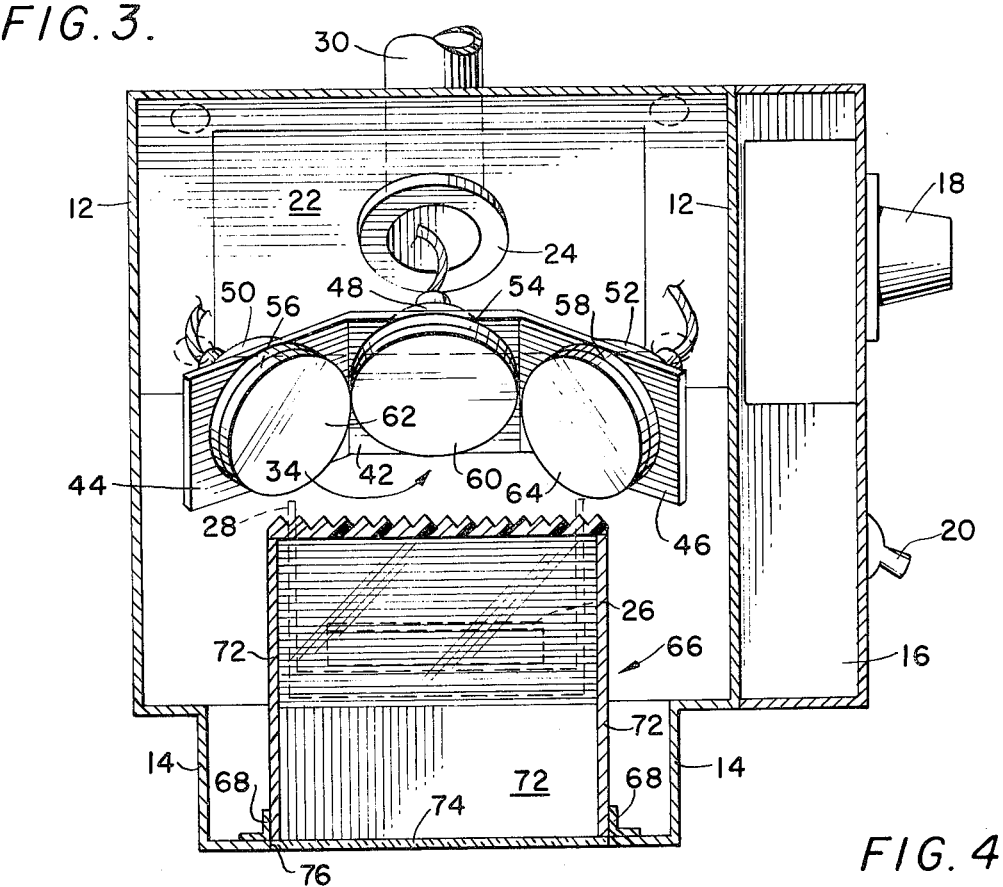
FIG. 3 is a sectional view taken along lines 3—3 of FIG. 2.

FIGS. 1, 2 and 3 illustrate the overall configuration of the housing for the lamphouse assembly 10. In practice, this assembly is designed to directly replace the lamphouse unit on any conventional photographic enlarger or printer, especially those formerly used exclusively for black and white work. An elongated hexagonal enclosure 12 with a depending bottom portion 14 houses the components of the lamphouse assembly. Besides providing a light shield, the shape of the enclosure 12 is specifically designed to furnish mounting surfaces for the optical components of the lamphouse assembly. A control module 16 attached to the outside of the enclosure 12 provides three variable voltage control knobs 18 and corresponding ON-OFF switches 20 for actuating pairs of red, green and blue light sources within the enclosure 12 and for individually controlling their relative intensity. The two angled side portions of the enclosure 12 are symmetrical with respect to each other. The upper half of each angled side portion includes a removable inspection cover plate 22 having an external exhaust hose fitting 24. The lower half of each angled side portion of the enclosure 12 includes an air intake port 26 covered by a box-shaped light baffle 28 closed on the bottom and both sides, but open on the top. Detachable exhaust hoses 30 are coupled to the fittings 24 on the cover plate 22 and lead to a common exhaust duct 32 coupled to a conventional exhaust blower (not shown). The partial vacuum created in the exhaust hoses 30 causes air to be drawn into the opposite sides of the enclosure 12 via the light baffles 28 and intake ports 26 and exhausted from the enclosure 12 through the fittings 24 in the cover plates 22.

Figure 4:
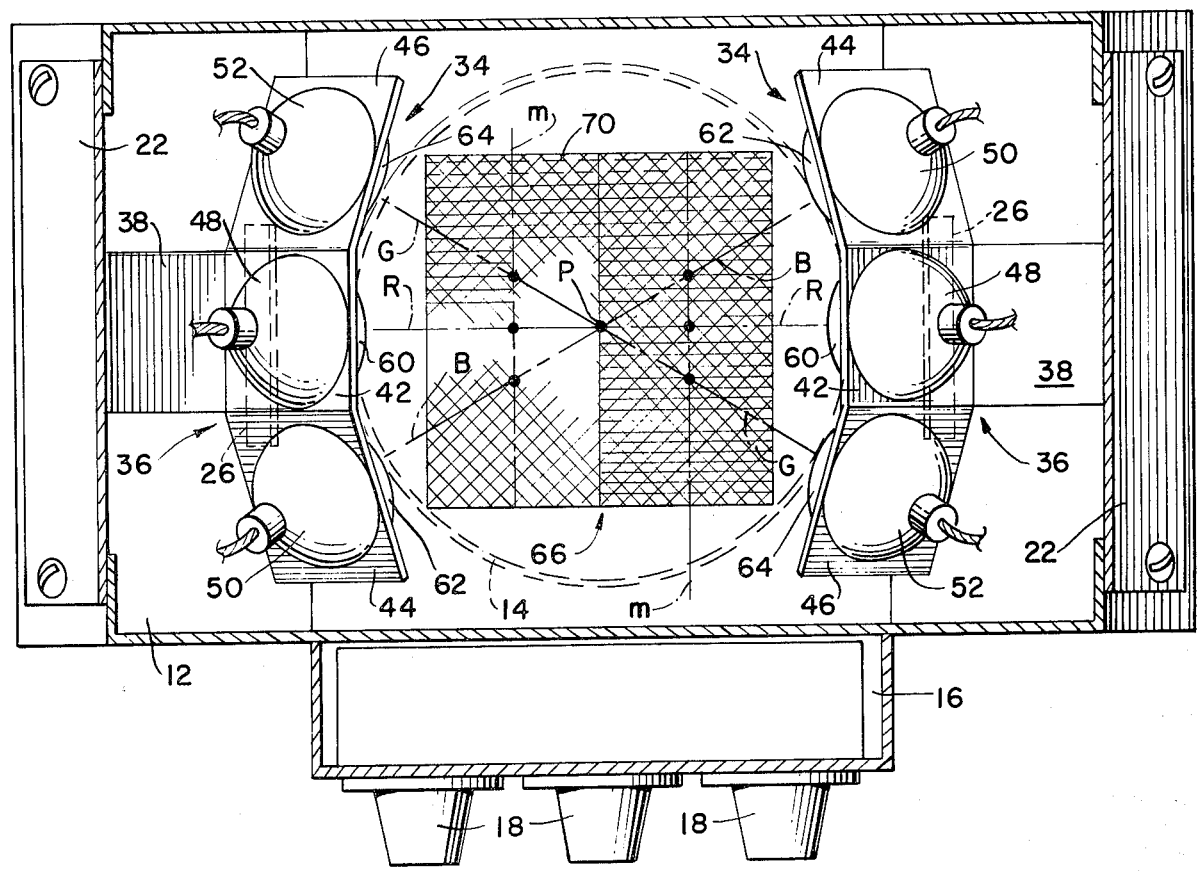
FIG. 4 is a sectional view taken along lines 4—4 of FIG. 2.

The interior of the enclosure 12, shown in FIGS. 2-4 includes a pair of symetrically arranged idential three-lamp assemblies 34. As shown in FIG. 2, each three-lamp assembly 34 includes a specially designed integral mounting bracket 36 having an elongated base portion 38 with a perpendicularly depending flange 40 on one end fixed to the corresponding cover plate 22. The other end of the elongated base portion 38 supports at right angles an apertured center plate 42 and two angled side plates 44 and 46 with similar apertures. The light emitting ends of corresponding lamps 48, 50 and 52 are secured respectively in the apertures in the plates 42, 44 and 46 of the mounting bracket 36. Lamps 48, 50 and 52 are preferably quartz halogen bulbs, which for their relatively small size emit intense white light. Heat absorbing glass plates 54, 56 and 58 are mounted directly over each corresponding aperture in the plates 42, 44 and 46 to stop the propagation of infrared energy. Dichroic color filter plates 60, 62 and 64 are mounted directly on top of the heat absorbing plates 54, 56 and 58, respectively. Each lamp and its corresponding heat absorbing and filter plates forms a single light source for a particular color. For example, the filter 60 for the center lamp 48 provides red light and the filters 62 and 64 for the side lamps 50 and 52 provide blue and green light, respectively. To remove heat from the lamphouse assembly 10, each three-lamp assembly 34 is disposed in the air flow path between the corresponding inlet port 26 and exhaust fitting 24.

The two sets of three-lamp assemblies 34 on either side of the enclosure 12 are individually aimed, by means of the mounting brackets 36, at a removable light mixing chamber 66 held in place by clip holders 68 in the recessed bottom portion 14 of the enclosure 12. The mixing chamber 66 has a house-like configuration including a peaked roof composed of two translucent diffusing panels 70 joined together preferably at a 90° angle at the top of the mixing chamber 66. The roof panels 70 forming the light entrance to the mixing chamber 66 are preferably made of styrene plastic with a textured surface to enhance diffusion of incident light. The inside surfaces of the upright sides 72 of the mixing chamber 66 have a reflective diffusing coating such as white paint. A final diffusing plate 74, preferably made of glass, forms the light exit of the lamphouse assembly 10 at the bottom of the mixing chamber 66. For this purpose, the bottom of the enclosure 12 is formed with an aperture 76 to allow passage of diffused light out of the bottom of the lamphouse assembly 10.

The lamp assembly mounting brackets 36 are configured such that they determine the direction of the optical axes of the light emitted from the lamps 48, 50 and 52 via their respective filters. The optical axes R for the lamps 48 providing red light preferably intersect the geometric centers of the respective roof panels 70 at right angles to the planes of the roof panels. The axes B and G of the blue and green light, provided respectively by the lamps 50 and 52, are aimed by means of the mounting brackets 36 such that the axes R, B and G associated with each three-lamp assembly 34 lie in a plane orthogonal to the respective roof panel 70, intersecting the roof panel along a middle line m, approximately parallel with the intersection of the roof panels and halfway down the respective roof panel. All six axes from the two three-lamp assemblies 34 preferably coincide at a single point P within the mixing changer 66.

Overlapping red, blue and green light is thus concentrated on each roof panel 70 and diffused therethrough into the interior of the mixing chamber 66. Pre-mixing of the light has occurred to a substantial degree by the time the light from each three-lamp assembly has passed through the respective roof panel 70 by virtue of the fact that the colors of light illuminate each roof panel 40 in an overlapping manner and are then further blended by means of the diffusing translucent panels 70 themselves. Once inside the mixing chamber 66, the light rays passing out of the roof panels radiate in all directions from the inside surfaces of the panels within the mixing chamber. Thus, many of the light rays from the roof panels 70 are reflected and further diffused by means of the diffusing reflective coating on the vertical walls 72 of the mixing chamber 66. The light rays are still further diffused by the final diffusing plate 74 which forms the light exit from the mixing chamber 66.

As shown in FIG. 2, the light emanating from the final diffusing plate 74 is evenly distributed over a photographic negative 78 clamped in place by a negative holder 80 which forms part of a conventional photographic enlarger unit in which the standard lamphouse is replaced by the lamphouse assembly according to the invention.

The unique configuration of the house-shaped mixing chamber with translucent roof panels permits maximum utilization of the direct intensity of the three-lamp assemblies 34 while ensuring thorough integration of the incident colored light so as to provide a soft, well bleneded white light for projection through the photographic negative. The increased intensity with thorough diffusion is accomplished with a configuration of marked simplicity and compactness in comparison to prior equipment of this nature.

One of the central features of this apparatus lies in the arrangement of the mounting brackets 36 in relation to the inspection cover plates 22. When one of the cover plates 22 is removed to inspect the apparatus, the corresponding three-lamp assembly 34 is also removed intact because the mounting bracket 36 holding lamps is secured to the inside surface of the cover plate 22. Replacing the cover plate 22 automatically aligns the lamps without further adjustment. That is, when the cover plate 22 is replaced on the enclosure 12, the mounting bracket 36 and thus the lamps 48, 50 and 52 automatically resume their correct positions within the enclosure. Accordingly, the cover plate 22 bears a predetermined geometrical relationship to the corresponding roof panel 70. In the preferred embodiment, the cover plate 22 is parallel to the roof panel 70 with the base portions 38 of the mounting bracket 36 perpendicular to both the cover plate 22 and roof panel 70. If the exhaust hoses 30 have sufficient flexibility, they may be left connected to the cover plate 22 during inspection; otherwise, the corresponding exhaust hose 30 can simply be uncoupled from the fitting 24 on the cover plate 24 before the cover plate is removed. Thus, the configuration of the enclosure 12 forms an integral part of the functional relationship of the components of the lamphouse assembly.

Each control knob 18 on the front of the lamphouse assembly 10 is connected to vary the intensity of a corresponding pair of lamps providing the same color, enabling individual control of each sensitive layer of a color print paper. For example, the two red printing lights can be turned on and the brightness adjusted as needed and then turned off while the remaining pairs of green and blue lights are separately adjusted to the desired level. The common power lead for the red, blue and green light circuits can then be connected to a conventional timing clock. With all three individual color control switches 20 in the ON position, activating the timing clock begins the exposure with all three colors of light illuminating the negative at their proper intensities.

The specific embodiment described above is obviously susceptible to many modifications and adaptations without departing from the underlying principles of the invention. For example, the specific number of light sources can be varied if desired although it is preferred to use two matched sets of three lamps for producing blended white light. If mixed light other than white light is desired, different colors of light can be employed, if necessary. The above embodiment is therefore intended to be illustrative rather than restrictive, the scope of the invention being indicated by the appended claims, and all variations within the range of equivalence are intended to be embraced therein.

I claim:

1. A lamphouse assembly for photographic printers and enlargers, comprising first illuminating means for directing light energy in a plurality of different colors, second illuminating means for directing light energy in a plurality of different colors, a closed light mixing chamber having a roof-shaped upper portion formed by two translucent roof panels joined at an angle, a plurality of side portions each having a reflective diffusing interior surface and a bottom portion directly below said upper portion formed by a translucent diffusing plate, first mounting means for aiming said first illuminating means at one of said translucent roof panels and second mounting means for aiming said second illuminating means at the other translucent roof panel, whereby said colors of light are diffused through said translucent roof panels, blended by reflection and diffusion within said mixing chamber and further diffused through said bottom diffusing plate to provide evenly distributed, mixed light.

2. The assembly of claim 1, wherein said first and second illuminating means each include a plurality of individual light sources providing light energy having different primary colors within each illuminating means, said first and second mounting means each including a unitary mounting bracket for aligning the optical axis of each individual light source at a predetermined angle and point of incidence with respect to the corresponding roof panel.

3. The assembly of claim 2, further comprising an apertured housing forming an enclosure for said mixing chamber and said first and second illuminating means, said mixing chamber being mounted such that mixed light is passed from said final diffusing plate out through a first aperture in said housing, said housing further including a pair of detachable inspection cover plates removably secured to adjacent portions of said housing each surrounding additional respective apertures, each said unitary mounting bracket being affixed to the inside of a corresponding one of said cover plates, whereby replacement of each said cover plate automatically aligns said individual light sources.

4. The assembly of claim 3, wherein said cover plates have respective exhaust hose fittings, said housing further including a pair of shielded, air inlet ports correspondingly arranged with respect to said exhaust hose fittings such that said respective illuminating means are approximately interposed between corresponding pairs of inlet ports and exhaust fittings.

5. The assembly of claim 2, wherein said first and second illuminating means each include three individual light sources respectively providing said primary colors, said first and second mounting means each positioning said three light sources side by side in an angled cluster such that the optical axis of the middle light source of each illuminating means intersects the corresponding roof panel approximately orthogonally at the center thereof.

6. The assembly of claim 5, further comprising a control module affixed to the outside of said housing having manually adjustable means for separately varying the intensity of corresponding pairs of said individual light sources and switch means for separately disconnecting said corresponding pairs of light sources from a source of electrical power.

7. The assembly of claim 5, wherein the other two light sources of each illuminating means are positioned such that the optical axes of all three light sources of each illuminating means define a plane approximately orthogonal to the plane of the corresponding roof panel and intersecting therewith in a line approximately parallel to the intersection of said roof panels and approximately bisecting said corresponding roof panel.

8. The assembly of claim 7, wherein the optical axes of the six individual light sources in said two illuminating means intersect approximately in a point in the interior of said light mixing chamber.

9. The assembly of claim 7, wherein said optical axes of the six individual light sources all pass obliquely through said final diffusing plate.

10. The assembly of claim 2, wherein the angle of intersection of said roof panels is about 90°.

11. The assembly of claim 10, wherein said side portions of said mixing chamber are upright with respect to said bottom diffusing plate.

* * * * *